(12) United States Patent
Chen

(10) Patent No.: US 8,930,129 B2
(45) Date of Patent: Jan. 6, 2015

(54) NAVIGATION SYSTEM WITH MULTIPLE USERS AND METHOD OF OPERATION THEREOF

(75) Inventor: Qian Chen, Fremont, CA (US)

(73) Assignee: Telenav, Inc., Sunnyvale, CA (US)

( * ) Notice: Subject to any disclaimer, the term of this patent is extended or adjusted under 35 U.S.C. 154(b) by 681 days.

(21) Appl. No.: 12/621,403

(22) Filed: Nov. 18, 2009

(65) Prior Publication Data

US 2011/0118975 A1     May 19, 2011

(51) Int. Cl.
*G01C 21/00*     (2006.01)
*G01C 21/34*     (2006.01)

(52) U.S. Cl.
CPC ................. *G01C 21/3438* (2013.01)
USPC ... 701/400; 455/456.1; 455/457; 340/995.17; 340/995.19; 340/995.23; 345/10; 345/30

(58) Field of Classification Search
USPC ........... 701/400; 455/456.1, 457; 340/995.17, 340/995.19, 995.23; 345/10, 30
See application file for complete search history.

(56) References Cited

U.S. PATENT DOCUMENTS

| | | | |
|---|---|---|---|
| 6,504,503 B1 | 1/2003 | Saint-Hilaire et al. | |
| 6,868,333 B2 | 3/2005 | Melen | |
| 6,885,874 B2 | 4/2005 | Grube et al. | |
| 6,892,135 B1 * | 5/2005 | Krull et al. | 701/431 |
| 6,963,294 B2 | 11/2005 | Kurosawa | |
| 7,003,288 B2 * | 2/2006 | Ueda et al. | 455/418 |
| 7,181,342 B2 * | 2/2007 | Matsubara et al. | 701/432 |
| 7,353,034 B2 | 4/2008 | Haney | |
| 7,480,567 B2 * | 1/2009 | Suomela et al. | 701/428 |
| 7,493,213 B2 * | 2/2009 | Lee et al. | 701/446 |
| 7,519,374 B2 * | 4/2009 | Hasegawa et al. | 455/456.1 |
| 7,612,948 B2 | 11/2009 | Sano | |
| 7,698,061 B2 * | 4/2010 | Singh | 701/420 |
| 8,005,488 B2 * | 8/2011 | Staffaroni et al. | 455/456.2 |
| 8,060,389 B2 * | 11/2011 | Johnson | 705/6 |
| 8,311,526 B2 * | 11/2012 | Forstall et al. | 455/414.3 |
| 2003/0100326 A1 * | 5/2003 | Grube et al. | 455/515 |
| 2003/0174047 A1 * | 9/2003 | Ohmura et al. | 340/7.48 |
| 2004/0002360 A1 * | 1/2004 | Chun et al. | 455/557 |
| 2004/0155814 A1 | 8/2004 | Bascobert | |
| 2006/0116818 A1 | 6/2006 | Chao et al. | |
| 2006/0229014 A1 * | 10/2006 | Harada et al. | 455/41.2 |
| 2006/0265119 A1 | 11/2006 | McMahan et al. | |
| 2008/0036778 A1 * | 2/2008 | Sheha et al. | 345/502 |

(Continued)

FOREIGN PATENT DOCUMENTS

| | | | |
|---|---|---|---|
| EP | 1233251 A2 * | 8/2002 | |
| JP | 11160076 A * | 6/1999 | |

OTHER PUBLICATIONS

International Search Report for Application No. PCT/US2010/057297 dated Jan. 7, 2011.

*Primary Examiner* — Tuan C. To
(74) *Attorney, Agent, or Firm* — IP Investment Law Group

(57) ABSTRACT

A method of operation of a navigation system includes: operating a communication unit for establishing a communication link between a first device and a second device; receiving a user defined destination; displaying a first location and a first route to the user defined destination on the first device and the second device, where the first location represents the location of the first device; and displaying a second location and a second route to the user defined destination on the first device and the second device, where the second location represents the location of the second device.

18 Claims, 7 Drawing Sheets

(56) References Cited

U.S. PATENT DOCUMENTS

| | | |
|---|---|---|
| 2008/0114543 A1 | 5/2008 | Vishnu |
| 2009/0270065 A1* | 10/2009 | Hamada et al. ............ 455/404.1 |
| 2009/0319172 A1* | 12/2009 | Almeida et al. .............. 701/201 |

* cited by examiner

NAVIGATION SYSTEM WITH MULTIPLE USERS AND METHOD OF OPERATION THEREOF

TECHNICAL FIELD

The present invention relates generally to a navigation system, and more particularly to a navigation system with navigation for multiple users.

BACKGROUND ART

Rapid growth in consumer electronics is evident with mobility as a ubiquitous feature. Consumer electronics products, such as music players, digital camera, personal digital assistant (PDA), cellular phones, and notebooks, offer means for users to create, transfer, store, and consume information almost anywhere, anytime.

One area of consumer electronics growth, where mobility is quintessential is in location based services, such as navigation systems utilizing satellite-based Global Positioning System (GPS) devices. One such use of location based services is to efficiently transfer or route users to a user defined destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest. The real-time information provides invaluable relevant information, when available or in service areas. The relevant information is also invaluable when service is not available, as well.

One common feature of current personal navigation devices is that they can display navigation information on a screen, such as: the location co-ordinates of the device at; the speed of the device; and the direction of movement of the device. While the navigation information can be displayed in any number of ways most users use a map mode, which causes a map to be displayed on the screen of the personal navigation device, indicating the location of the device on the map.

Although users benefit greatly from the navigation functions of conventional navigation systems they still have difficulty timing and coordinating meetings with friends and colleagues. At the present the only way for users to coordinate meetings is through a series of phone calls, e-mails, or text messages. A navigation system is needed to address above drawbacks of these conventional systems.

Thus, a need still remains for a navigation system for multiple users that will allow users to more easily coordinate their activities with other people. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: operating a communication unit for establishing a communication link between a first device and a second device; receiving a user defined destination; displaying a first location and a first route to the user defined destination on the first device and the second device, where the first location represents the location of the first device; and displaying a second location and a second route to the user defined destination on the first device and the second device, where the second location represents the location of the second device.

The present invention provides a navigation system, including: a communication unit for establishing a communication link between a first device and a second device, including: a communication interface for receiving a user defined destination; and a display interface, coupled to the communication unit, for displaying a first location and a first route to the user defined destination, and a second location and a second route to the user defined destination on the first device and the second device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
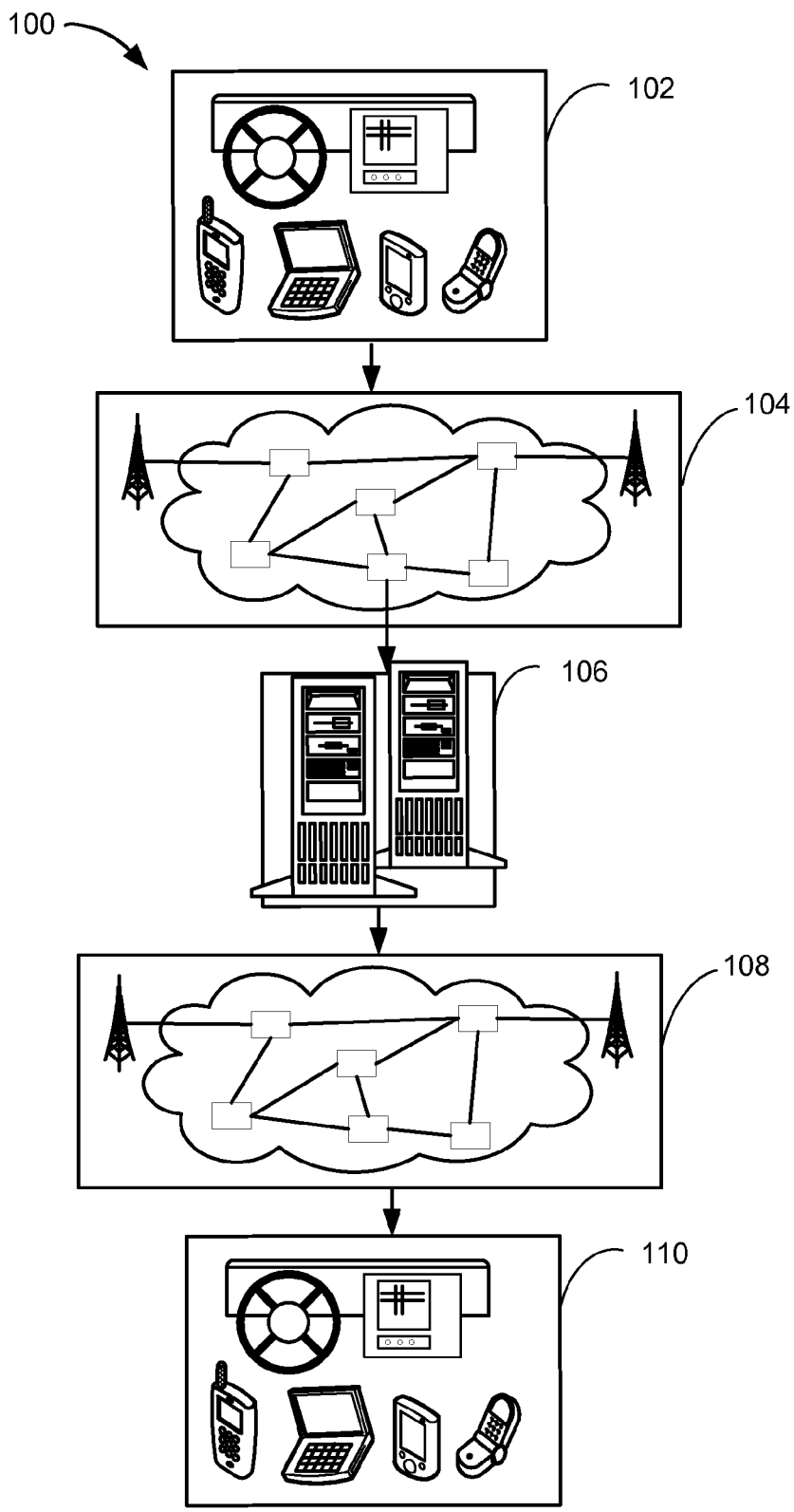
FIG. 1 is a navigation system in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element comprising a speed component and a heading component.

The term "relevant information" referred to herein comprises the navigation information described, such as locations, routes, current speeds, estimated times of arrival, as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "coupling" or "coupled" referred to herein can include any physical or non-physical connecting, joining or linking of a device, module, unit or element of the navigation system.

Referring now to FIG. 1, therein is shown a navigation system 100 in a first embodiment of the present invention. The navigation system 100 includes a first device 102, such as a client, connected to an intermediate device 106, such as a client or server, and a second device 110, such as a client, with a first communication path 104, such as a wireless or wired network and a second communication path 108, such as a wireless or wired network.

The first device 102 can be, for example, any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train.

In another example, the first device 102 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™. The first device 102 can couple to the first communication path 104 to communicate with the intermediate device 106 or to the second communication path 108 to communicate with the second device 110.

The first communication path 104 can be a variety of networks. For example, the first communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the first communication path 104. Ethernet, digital subscriber line (DSL), fiber to the home (FTTH), and plain old telephone service (POTS) are examples of wired communication that can be included in the first communication path 104.

Further, the first communication path 104 can traverse a number of network topologies and distances. For example, the first communication path 104 can include direct connection, personal area network (PAN), local area network (LAN), metropolitan area network (MAN), wide area network (WAN) or any combination thereof.

The intermediate device 106 can be any of a variety of centralized or decentralized computing devices. For example, the intermediate device 106 can be a computer, grid computing resources, a virtualized computer resource, cloud computing resource, routers, switches, peer-to-peer distributed computing devices, or a combination thereof.

The intermediate device 106 can be centralized in a single computer room, distributed across different rooms, distributed across different geographical locations, embedded within a telecommunications network. The intermediate device 106 can connect with the first communication path 104 and the second communication path 108 to communicate with the first device 102 and the second device 110. The intermediate device 106 can also be a client type device as described for the first device 102.

In another example, the intermediate device 106 can be a particularized machine, such as a mainframe, a server, a cluster server, rack mounted server, or a blade server, or as more specific examples, an IBM System z10™ Business Class mainframe or a HP ProLiant ML™ server. Yet another example, the intermediate device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

The second communication path 108 can be a variety of networks. For example, the second communication path 108 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the second communication path 108. Ethernet, digital subscriber line (DSL), fiber to the home (FTTH), and plain old telephone service (POTS) are examples of wired communication that can be included in the second communication path 108.

Further, the second communication path 108 can traverse a number of network topologies and distances. For example, the second communication path 108 can include direct connection, personal area network (PAN), local area network (LAN), metropolitan area network (MAN), wide area network (WAN) or any combination thereof.

The second device 110 can be, for example, of any of a variety of mobile devices, such as a cellular phone, personal digital assistant, a notebook computer, automotive telematic navigation system, or other multi-functional mobile communication or entertainment device. The second device 110 can be a standalone device, or can be incorporated with a vehicle, for example a car, truck, bus, or train. In another example, the second device 110 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™. The second device 110 can couple to the second communication path 108 to communicate with the intermediate device 106 or to the first communication path 104 to communicate with the first device 102.

Also for illustrative purposes, the navigation system 100 is shown with the second device 110 and the first device 102 as end points of the first communication path 104 and the second communication path 108, although it is understood that the navigation system 100 can have a different partition among the first device 102, the second device 110, the first communication path 104, and the second communication path 108. For example, the first device 102, the second device 110, or a combination thereof can also function as part of the first communication path 104, and the second communication path 108.

Further for illustrative purposes, the navigation system 100 is shown with the first communication path 104 and the second communication path 108 as separate communication paths, although it is understood that the navigation system 100 can have a different configuration. For example, the all or a portion the first communication path 104 can be part of the second communication path 108 or vice versa.

Figure 2:
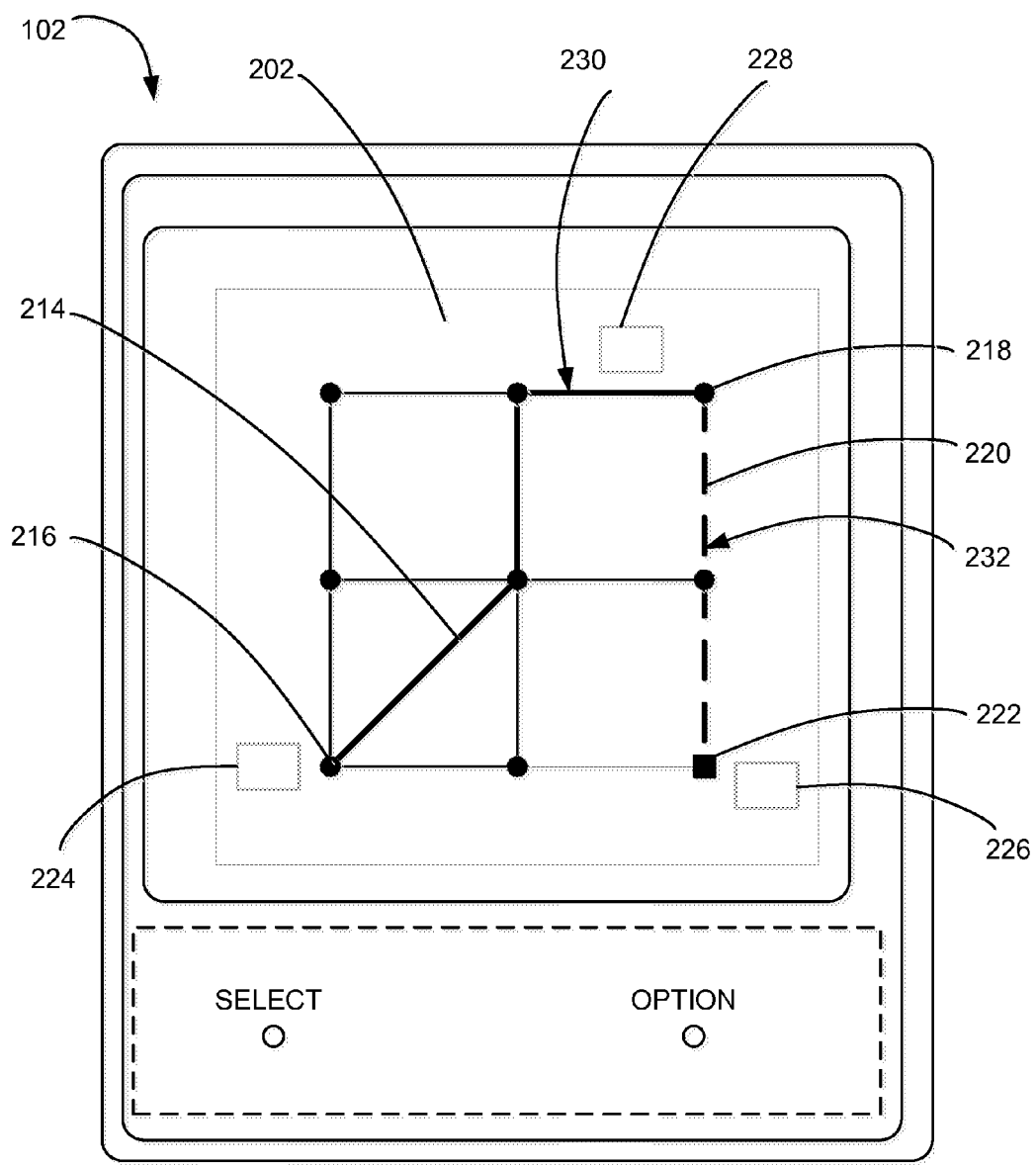
FIG. 2 is a display interface of the first device in a first example of the navigation system of FIG. 1.

Referring now to FIG. 2, therein is shown a display interface 202 of the first device 102 in a first example of the navigation system 100 of FIG. 1. FIG. 2 shows a first route 214 between a first location 216, representing the location of the first device 102, and a user defined destination 218.

The display interface 202 can display a second route 220 between a second location 222, representing the location of another device, such as the second device 110 of FIG. 1, and the user defined destination 218. The first route 214 is preferably displayed so that it has a first line characteristic 230 that is different from a second line characteristic 232 of the second route 220. The first line characteristic 230 and the second line characteristic 232 can include line density, line thickness, line brightness, or line color. For example, the first route 214 can be displayed as having the first line characteristic 230 of a solid line, a thick line, a bright line or a brightly colored line, while the second route 220 can be displayed as having the second line characteristic 232 of a dotted line, a thin line, a dark lightly or a darkly colored line. The first route 214, the first location 216, the second route 220, and the second location 222 can be determined in real time or at predetermined intervals.

For illustrative purposes the first route 214 and the second route 220 are shown on a grid; however it is understood that the first route 214 and the second route 220 can be displayed on any number of visual representations, including street level maps, topographical maps, and satellite images.

The display interface 202 can also depict a first estimated time of arrival 224 and a second estimated time of arrival 226 indicating the estimated times of arrival of the first device 102 and the second device 110 respectively. The first estimated time of arrival 224 and the second estimated time of arrival 226 can include, for example, the estimated times of arrival of each device, the amount of time left before the devices arrive at the user defined destination 218 or the distance of each device from the user defined destination 218. The first estimated time of arrival 224 and the second estimated time of arrival 226 can be determined and disclosed in real time or at predetermined intervals.

Also for illustrative purposes, the first estimated time of arrival 224 and the second estimated time of arrival 226 are shown on the display interface 202 next to the first location 216 and the second location 222 respectively. However, it is understood that the first estimated time of arrival 224 and the second estimated time of arrival 226 can be displayed anywhere on the display interface 202. Furthermore, it is understood that the first estimated time of arrival 224 and the second estimated time of arrival 226 need not be displayed on the display interface 202, but can take the form of an audio announcement.

The display interface 202 can also depict a reminder 228. The reminder 228 can be displayed whenever an event occurs and can convey a variety of information related to that event. For example the reminder 228 can be displayed when an event occurs such as a change in the estimated arrival or the speed of the first device 102 or the second device 110, the arrival of the first device 102 or the second device 110 at the user defined destination 218, the arrival of the first device 102 or the second device 110 within a preselected distance of the user defined destination 218, or a change in the user defined destination 218.

It is understood that the routes, waypoints, estimated times of arrival, reminders, and other relevant information depicted as being displayed on the display interface 202 of the first device 102 can be displayed on another device with which the first device 102 is sharing relevant information. The second device 110 can be that other device and can display the shared relevant information at the same time that it is being displayed on the first device 102.

It has been discovered that the navigation system 100 allows a user of a navigation device to coordinate their activities and travel with others by sharing information with users of other navigation devices. The navigation system 100 allows a user to select a destination, share that destination with another device, and receive navigation information regarding that destination from another device. The navigation system 100 can display the locations, routes and estimated times of arrivals of multiple users in real time on multiple devices allowing for easier coordination of activities and travel. The navigation system 100 is further capable of displaying the shared relevant information in a non-intrusive manner, such as with different line characteristics, so that the user can focus on his or her navigation without being distracted by the shared information.

Figure 3:
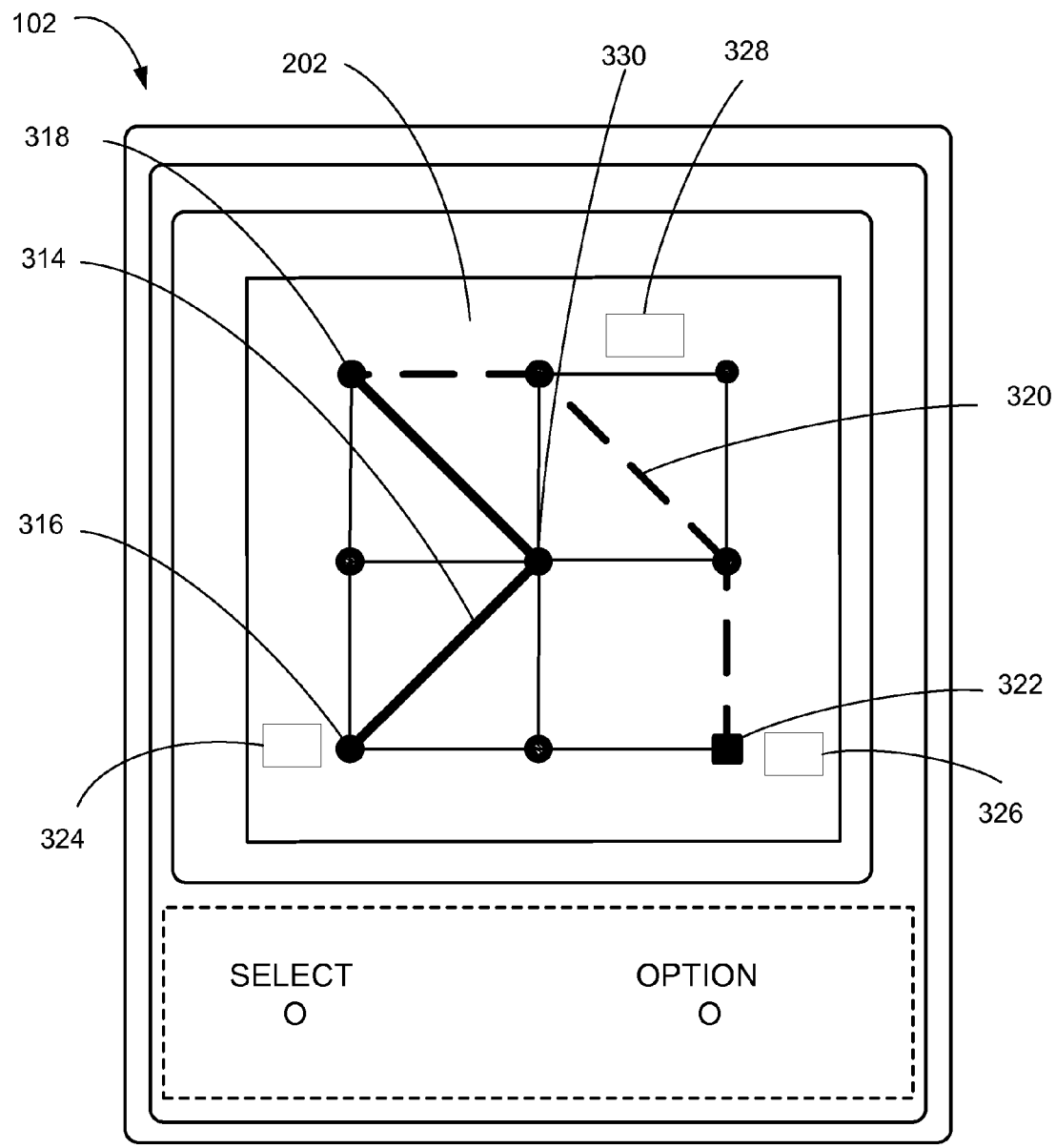
FIG. 3 is the display interface in a second example of the navigation system of FIG. 1.

Referring now to FIG. 3, therein is shown the display interface 202 in a second example of the navigation system 100 of FIG. 1. FIG. 3 depicts the display interface 202 of the first device 102 after the navigation system 100 has received a revised user defined destination 318 selected by a user (not shown) of the first device 102 and has received a waypoint 330 inserted into the first route 214 of FIG. 2 by the user of the first device 102. It is understood that the navigation system 100 can receive the revised user defined destination 318 or the waypoint 330 selected by or inserted by another user (not shown) of the second device 110 of FIG. 1.

The display interface 202 can display a first revised route 314 between a first location 316, the waypoint 330, and the revised user defined destination 318. The first revised route 314 reflects a change in the first route 214 based on both the selection and reception of the revised user defined destination 318 and the reception and insertion of the waypoint 330 into the first route 214.

It is understood that the first revised route 314 can be generated with only the reception and insertion of the waypoint 330 or with only the selection and reception of the revised user defined destination 318. It is also understood that if the first route 214 was generated with the waypoint 330 already received and inserted into it, the first revised route 314 can also be generated by changing the location of the waypoint 330 or by removing the waypoint 330. Furthermore, it is understood that the navigation system 100 can receive the waypoint 330 inserted into a route, such as the second route 220 of FIG. 2 by another user (not shown) of the second device 110.

The display interface 202 can also depict a second revised route 320 between a second location 322 and the revised user defined destination 318. The second revised route 320 can be displayed to reflect the selection and reception of the revised user defined destination 318, the reception and insertion of the waypoint 330 into a route, such as the second route 220, or some combination thereof.

The second revised route 320 is preferably displayed so that it has a line characteristic that is different from the line characteristic of the first revised route 314. For example, the first revised route 314 can be displayed as solid line, a thick line, a bright line or a brightly colored line, while the second revised route 320 can be displayed as a dotted line, a thin line, a dark lightly or a darkly colored line.

The display interface 202 can also depict a first estimated time of arrival 324 and a second estimated time of arrival 326 indicating the estimated times of arrival of the first device 102 and the second device 110 respectively. The first estimated time of arrival 324 and the second estimated time of arrival 326 can include, for example, the estimated times of arrival of each device, the amount of time left before the devices arrive at the revised user defined destination 318 or the distance each device is from the revised user defined destination 318. The first estimated time of arrival 324 and the second estimated time of arrival 326 can be determined and disclosed in real time or at predetermined intervals.

Also for illustrative purposes, the first estimated time of arrival 324 and the second estimated time of arrival 326 are shown on the display interface 202 next to the first location 316 and the second location 322 respectively. However, it is understood that the first estimated time of arrival 324 and the second estimated time of arrival 326 can be displayed anywhere on the display interface 202. Furthermore, it is understood that the first estimated time of arrival 324 and the second estimated time of arrival 326 need not be displayed on the display interface 202, but can be delivered as an audio announcement.

The display interface 202 can also depict a reminder 328. The reminder 328 can be displayed whenever an event occurs and can convey a variety of information related to that event. For example the reminder 328 can be displayed when an event occurs such as a change in the estimated arrival or the speed of the first device 102 or the second device 110, the arrival of the first device 102 or the second device 110 at the revised user defined destination 318 or within a preselected distance of the revised user defined destination 318, the reception or selection of the waypoint 330, or the reception or selection of the revised user defined destination 318.

It has been also discovered that the navigation system 100 provides selection of a new destination or insertion of additional waypoints into a route and can provide updated locations, routes and estimated times of arrivals based on this new information. The routes, waypoints, estimated times of arrival, reminders, and other relevant information depicted as being displayed on the display interface 202 of the first device 102 can be displayed on another device with which the first device 102 is sharing relevant information, such as the second device 110, at the same time that it is being displayed on the first device 102.

It has been further discovered that the navigation system 100 provides unprecedented capabilities for the coordination and monitoring of multiple users on a single device by allowing a users to change or modify their shared routes during navigation. The navigation system 100 allows the selection of a new destination or insertion of additional waypoints into a route and can provide revised routes and estimated times of arrivals for multiple devices based on this new information in real time.

Figure 4:
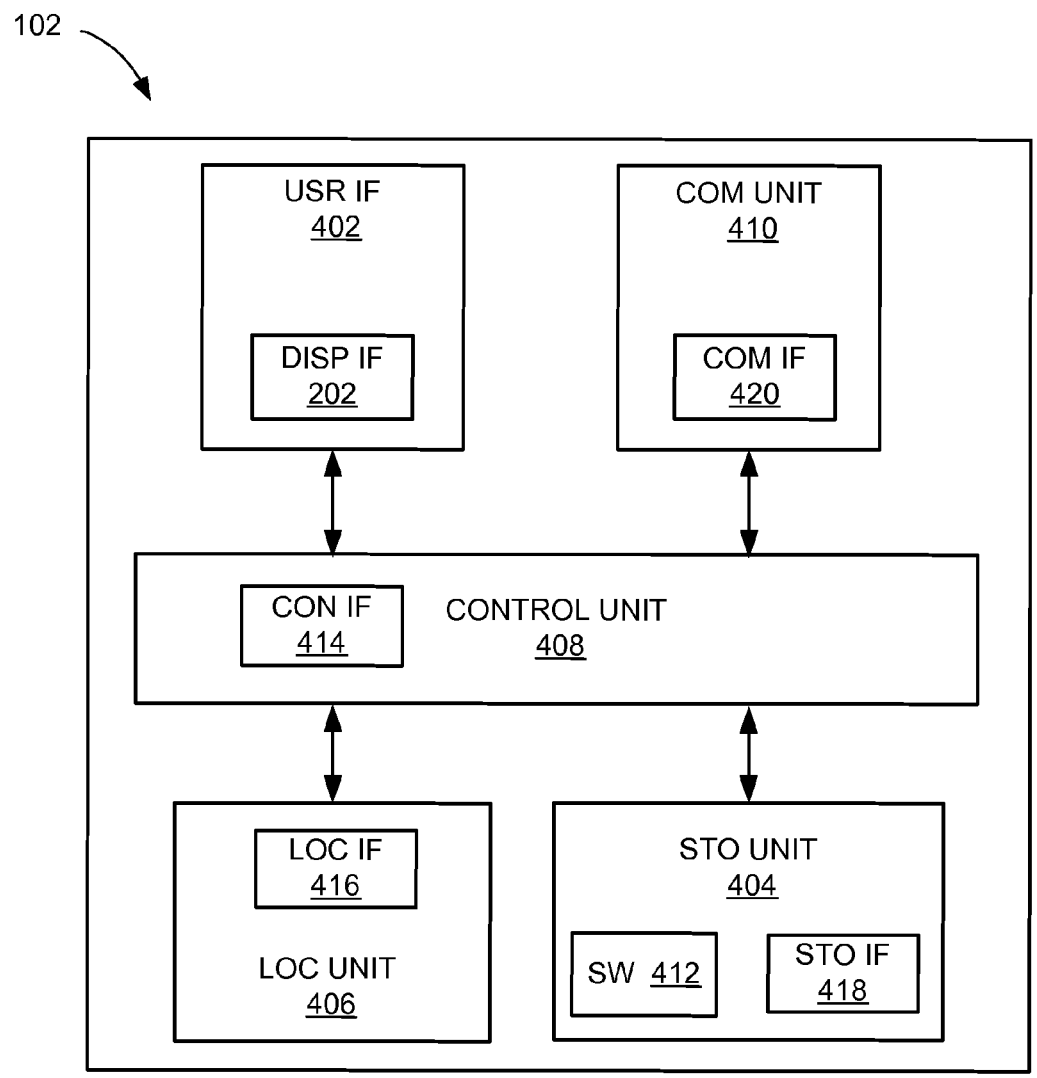
FIG. 4 is a block diagram of the first device of the navigation system of FIG. 1.

Referring now to FIG. 4, therein is shown a block diagram of the first device 102 of the navigation system 100 of FIG. 1. It is understood, that while FIG. 4 depicts a block diagram of the first device 102, the block diagram can also represent an exemplary block diagram of the second device 110 of FIG. 1.

The first device 102 can include a user interface 402, a storage unit 404, a location unit 406, a control unit 408, and a communication unit 410.

The user interface 402 allows a user (not shown) to interface and interact with the first device 102. The user interface 402 can include an input device and an output device. Examples of the input device of the user interface 402 can include a keypad, a touchpad, soft-keys, a keyboard, a microphone, or any combination thereof to provide data and communication inputs. Examples of the output device of the user interface 402 can include the display interface 202. The display interface 202 can include a display, a projector, a video screen, a speaker, or any combination thereof.

The control unit 408 can execute a software 412 to provide the intelligence for the navigation system 100. The control unit 408 can operate the user interface 402 to display information generated by the navigation system 100. The control unit 408 can also execute the software 412 for the other functions of the navigation system 100, including receiving location information from the location unit 406, sending, receiving and processing requests to share relevant information and processing relevant information received from other devices. The control unit 408 can further execute the software 412 for interaction with the first communication path 104 of FIG. 1 via the communication unit 410.

The control unit 408 can be implemented in a number of different manners. For example, the control unit 408 can be a processor, an embedded processor, a microprocessor, a hardware control logic, a hardware finite state machine (FSM), a digital signal processor (DSP), or a combination thereof.

The control unit 408 can include a controller interface 414. The controller interface 414 can be used for communication between the control unit 408 and other functional units in the first device 102. The controller interface 414 can also be used for communication that is external to the first device 102, such as communication to the intermediate device 106 of FIG. 1 of FIG. 1, another navigation device, a cell phone, a laptop, or a computer.

The controller interface 414 can receive information from the other functional units or from external sources, or can transmit information to the other functional units or to external destinations. The external sources and the external destinations refer to sources and destinations external to the first device 102.

The controller interface 414 can be implemented in different ways and can include different implementations depending on which functional units or external units are being interfaced with the controller interface 414. For example, the controller interface 414 can be implemented with a pressure sensor, an inertial sensor, a micro-electromechanical system (MEMS), optical circuitry, waveguides, wireless circuitry, wireline circuitry, or a combination thereof.

The location unit 406 can generate location information, current heading, and current speed of the first device 102, as examples. The location unit 406 can be implemented in many ways. For example, the location unit 406 can function as at least a part of a global positioning system (GPS), an inertial navigation system, a cell-tower location system, a pressure location system, or any combination thereof.

The location unit 406 can include a location interface 416. The location interface 416 can be used for communication between the location unit 406 and other functional units in the first device 102. The location interface 416 can also be used for communication that is external to the first device 102.

The location interface 416 can receive information from the other functional units or from external sources, or can transmit information to the other functional units or to external destinations. The external sources and the external destinations refer to sources and destinations external to the first device 102.

The location interface 416 can include different implementations depending on which functional units or external units are being interfaced with the location unit 406. The location interface 416 can be implemented with technologies and techniques similar to the implementation of the controller interface 414.

The storage unit 404 can store the software 412. The storage unit 404 can also store the relevant information, such as relevant information received from other devices, advertisements, points of interest (POI), navigation routing entries, or any combination thereof.

The storage unit 404 can be a volatile memory, a nonvolatile memory, an internal memory, an external memory, or a combination thereof. For example, the storage unit 404 can be a nonvolatile storage such as non-volatile random access memory (NVRAM), Flash memory, disk storage, or a volatile storage such as static random access memory (SRAM).

The storage unit 404 can include a storage interface 418. The storage interface 418 can be used for communication between the location unit 406 and other functional units in the first device 102. The storage interface 418 can also be used for communication that is external to the first device 102.

The storage interface 418 can receive information from the other functional units or from external sources, or can transmit information to the other functional units or to external destinations. The external sources and the external destinations refer to sources and destinations external to the first device 102.

The storage interface 418 can include different implementations depending on which functional units or external units are being interfaced with the storage unit 404. The storage interface 418 can be implemented with technologies and techniques similar to the implementation of the controller interface 414.

The communication unit 410 can enable external communication to and from the first device 102. For example, the communication unit 410 can permit the first device 102 to communicate with the intermediate device 106 of FIG. 1, the second device 110 of FIG. 1, an attachment, such as a peripheral device or a computer desktop, the first communication path 104 and the second communication path 108.

The communication unit 410 can also function as a communication hub allowing the first device 102 to function as part of the first communication path 104 or as part of the second communication path 108 and not limited to be an end point or terminal unit to the communication unit 410. The communication unit 410 can include active and passive components, such as microelectronics or an antenna, for interaction with the first communication path 104 or the second communication path 108.

The communication unit 410 can include a communication interface 420. The communication interface 420 can be used for communication between the communication unit 410 and other functional units in the first device 102. The communication interface 420 can receive information from the other functional units or can transmit information to the other functional units.

The communication interface 420 can include different implementations depending on which functional units are being interfaced with the communication unit 410. The communication interface 420 can be implemented with technologies and techniques similar to the implementation of the controller interface 414.

For illustrative purposes, the navigation system 100 is shown with the partition having the user interface 402, the storage unit 404, the location unit 406, the control unit 408, and the communication unit 410 although it is understood that the navigation system 100 can have a different partition. For example, the software 412 can be partitioned differently such that some or all of its function can be in the control unit 408, the location unit 406, and the communication unit 410. Also, the first device 102 can include other functional units not shown in FIG. 4 for clarity.

The functional units in the first device 102 can work individually and independently of the other functional units. The first device 102 can work individually and independently from the intermediate device 106 of FIG. 1, the second device 110 of FIG. 1, the first communication path 104 of FIG. 1 and the second communication path 108 of FIG. 1.

Figure 5:
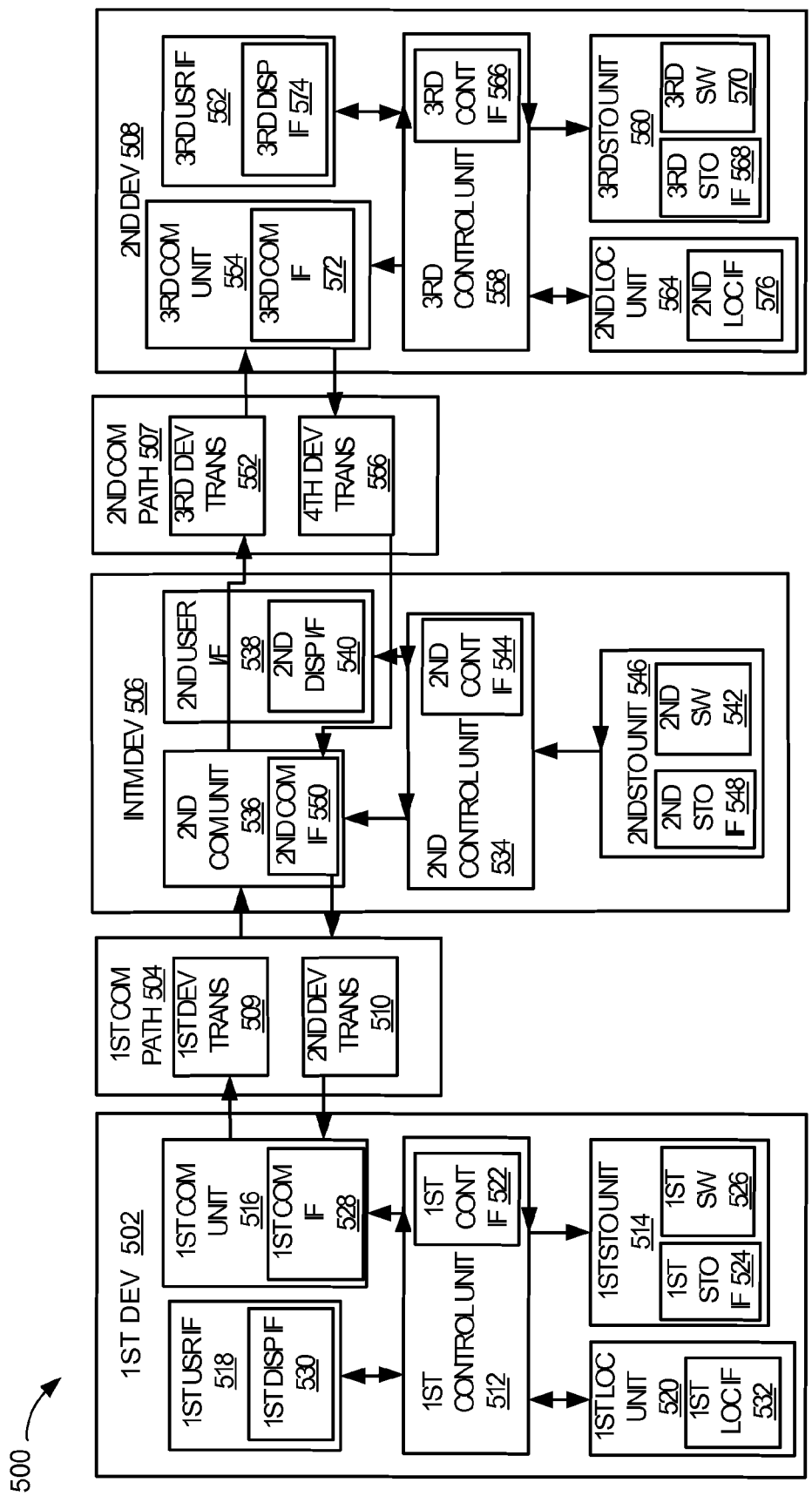
FIG. 5 is a block diagram of a navigation system in a second embodiment of the present invention.

Referring now to FIG. 5, therein is shown a block diagram of a navigation system 500 in a second embodiment of the present invention. The navigation system 500 can include a first device 502, a first communication path 504, an intermediate device 506, a second communication path 507, and a second device 508.

The first device 502 can communicate with the intermediate device 506 over the first communication path 504. For example, the first device 502, the first communication path 504, and the intermediate device 506 can be the first device 102 of FIG. 1, the first communication path 104 of FIG. 1, and the intermediate device 106 of FIG. 1, respectively. The screen shot shown on the display interface 202 described in FIG. 2 can represent the screen shot for the navigation system 500.

The first device 502 can send information in a first device transmission 509 over the first communication path 504 to the intermediate device 506. The intermediate device 506 can send information in a second device transmission 510 over the first communication path 504 to the first device 502.

For brevity of description in this embodiment of the present invention, the first device 502 will be described as a client device and the intermediate device 506 will be described as a server device. The present invention is not limited to this selection for the type of devices. The selection is an example of the present invention.

The first device 502 can include a first control unit 512, a first storage unit 514, a first communication unit 516, a first user interface 518, and a first location unit 520. The first device 502 can be similarly described by the first device 102.

The first control unit 512 can include a first controller interface 522. The first control unit 512 and the first controller interface 522 can be similarly described as the control unit 408 of FIG. 4 and the controller interface 414 of FIG. 4, respectively.

The first storage unit 514 can include a first storage interface 524. The first storage unit 514 and the first storage interface 524 can be similarly described as the storage unit 404 of FIG. 4 and the storage interface 418 of FIG. 4, respectively. A first software 526 can be stored in the first storage unit 514.

The first communication unit 516 can include a first communication interface 528. The first communication unit 516 and the first communication interface 528 can be similarly described as the communication unit 410 of FIG. 4 and the communication interface 420 of FIG. 4, respectively.

The first user interface 518 can include a first display interface 530. The first user interface 518 and the first display interface 530 can be similarly described as the user interface 402 of FIG. 4 and the display interface 202 of FIG. 4, respectively.

The first location unit 520 can include a first location interface 532. The first location unit 520 and the first location interface 532 can be similarly described as the location unit 406 of FIG. 4 and the location interface 416 of FIG. 4, respectively.

The performance, architectures, and type of technologies can also differ between the first device 102 and the first device 502. For example, the first device 102 can function as a single device embodiment of the present invention and can have a higher performance than the first device 502. The first device 502 can be similarly optimized for a multiple device embodiment of the present invention.

For example, the first device 102 can have a higher performance with increased processing power in the control unit 408 compared to the first control unit 512. The storage unit 404 can provide higher storage capacity and access time compared to the first storage unit 514.

Also for example, the first device 502 can be optimized to provide increased communication performance in the first communication unit 516 compared to the communication unit 410. The first storage unit 514 can be sized smaller compared to the storage unit 404. The first software 526 can be smaller than the software 412 of FIG. 4.

The intermediate device 506 can be optimized for implementing the present invention in a multiple device embodiment with the first device 502. The intermediate device 506 can provide the additional or higher performance processing power compared to the first device 502. The intermediate device 506 can include a second control unit 534, a second communication unit 536, and a second user interface 538.

The second user interface 538 allows a user (not shown) to interface and interact with the intermediate device 506. The second user interface 538 can include an input device and an output device. Examples of the input device of the second user interface 538 can include a keypad, a touchpad, softkeys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence for the intermediate device 506 of the navigation system 500. The second software 542 can operate in conjunction with the first software 526. The second control unit 534 can provide additional performance compared to the first control unit 512 or the control unit 408.

The second control unit 534 can operate the second user interface 538 to display information. The second control unit 534 can also execute the second software 542 for the other functions of the navigation system 500, including operating the second communication unit 536 to communicate with the first device 502 over the first communication path 504 or to communicate with the second device 508 over the second communication path 507.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the intermediate device 506. The second controller interface 544 can also be used for communication that is external to the intermediate device 506.

The second controller interface 544 can receive information from the other functional units or from external sources, or can transmit information to the other functional units or to external destinations. The external sources and the external destinations refer to sources and destinations external to the intermediate device 506.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as relevant information received from other devices, advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 500 is shown with the second storage unit 546 as a single hierarchy storage system, although it is understood that the navigation system 500 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as nonvolatile random access memory (NVRAM), Flash memory, disk storage, or a volatile storage such as static random access memory (SRAM).

The second storage unit 546 can include a second storage interface 548. The second storage interface 548 can be used for communication between the first location unit 520 and other functional units in the intermediate device 506. The second storage interface 548 can also be used for communication that is external to the intermediate device 506.

The second storage interface 548 can receive information from the other functional units or from external sources, or can transmit information to the other functional units or to external destinations. The external sources and the external destinations refer to sources and destinations external to the intermediate device 506.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the intermediate device 506. For example, the second communication unit 536 can permit the intermediate device 506 to communicate with the first device 502 over the first communication path 504 or to communicate with the second device 508 over the second communication path 507.

The second communication unit 536 can also function as a communication hub allowing the intermediate device 506 to function as part of the first communication path 504 or the second communication path 507 and not limited to be a terminal unit to the first communication path 504 or the second communication path 507. The second communication unit 536 can include active and passive components, such as microelectronics or an antenna, for interaction with the first communication path 504.

The second communication unit 536 can include a second communication interface 550. The second communication interface 550 can be used for communication between the second communication unit 536 and other functional units in the intermediate device 506. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the first communication path 504 to send information to the intermediate device 506 in the first device transmission 509, including information sent from the second device 508. The intermediate device 506 can receive information in the second communication unit 536 from the first device transmission 509 of the first communication path 504.

The second communication unit 536 can couple with the second communication path 507 to send information to the second device 508 in a third device transmission 552. The second device 508 can receive information in a third communication unit 554 from the third device transmission 552 of the second communication path 507, including information sent by the first device 502.

The third communication unit 554 can couple with the second communication path 507 to send information to the intermediate device 506 in a fourth device transmission 556. The intermediate device 506 can receive information in the second communication unit 536 from the fourth device transmission 556 of the second communication path 507. The navigation system 500 can be executed by the first control unit 512, the second control unit 534, a third control unit 558, or a combination thereof.

For illustrative purposes, the intermediate device 506 is shown with the partition having the second user interface 538, the second storage unit 546, the second control unit 534, and the second communication unit 536, although it is understood that the intermediate device 106 can have a different partition. For example, the second software 542 can be partitioned differently such that some or all of its function can be in the second control unit 534 and the second communication unit 536. Also, the intermediate device 506 can include other functional units not shown in FIG. 4 for clarity.

The second device 508 can communicate with the intermediate device 506 over the second communication path 507.

For example, the second device 508, the second communication path 507, and the intermediate device 506 can be the second device 110 of FIG. 1, the second communication path 108 of FIG. 1, and the intermediate device 106 of FIG. 1, respectively. The screen shot shown on the display interface 202 described in FIG. 2 or FIG. 3 can represent the screen shot for the navigation system 500.

The intermediate device 506 can send information in the third device transmission 552 over the second communication path 507 to the second device 508. The second device 508 can send information in the fourth device transmission 556 over the second communication path 507 to the intermediate device 506.

For brevity of description in this embodiment of the present invention, the second device 508 will be described as a client device and the intermediate device 506 will be described as a server device. The present invention is not limited to this selection for the type of devices. The selection is an example of the present invention.

The second device 508 can include the third control unit 558, a third storage unit 560, the third communication unit 554, a third user interface 562, and a second location unit 564. The second device 508 can be similarly described by the second device 110 of FIG. 1.

The third control unit 558 can include a third controller interface 566. The third control unit 558 and the third controller interface 566 can be similarly described as the control unit 408 of FIG. 4 and the controller interface 414 of FIG. 4, respectively.

The third storage unit 560 can include a third storage interface 568. The third storage unit 560 and the third storage interface 568 can be similarly described as the storage unit 404 of FIG. 4 and the storage interface 418 of FIG. 4, respectively. A third software 570 can be stored in the third storage unit 560.

The third communication unit 554 can include a third communication interface 572. The third communication unit 554 and the third communication interface 572 can be similarly described as the communication unit 410 of FIG. 4 and the communication interface 420 of FIG. 4, respectively.

The third user interface 562 can include a third display interface 574. The third user interface 562 and the third display interface 574 can be similarly described as the user interface 402 of FIG. 4 and the display interface 202 of FIG. 4, respectively.

The second location unit 564 can include a second location interface 576. The second location unit 564 and the second location interface 576 can be similarly described as the location unit 406 of FIG. 4 and the location interface 416 of FIG. 4, respectively.

The performance, architectures, and type of technologies can also differ between the second device 110 and the second device 508. For example, the second device 110 can function as a single device embodiment of the present invention and can have a higher performance than the second device 508. The second device 508 can be similarly optimized for a multiple device embodiment of the present invention.

For example, the second device 110 can have a higher performance with increased processing power in the control unit 408 compared to the third control unit 558. The storage unit 404 can provide higher storage capacity and access time compared to the third storage unit 560.

Also for example, the second device 508 can be optimized to provide increased communication performance in the third communication unit 554 compared to the communication unit 410. The third storage unit 560 can be sized smaller compared to the storage unit 404. The third software 570 can be smaller than the software 412 of FIG. 4.

The functional units in the first device 502 can work individually and independently of the other functional units. The first device 502 can work individually and independently from the intermediate device 506 and the first communication path 504 and independently from the second device 508 and the second communication path 507.

The functional units in the intermediate device 506 can work individually and independently of the other functional units. The intermediate device 506 can work individually and independently from the first device 502 and the first communication path 504 and independently from the second device 508 and the second communication path 507.

The functional units in the second device 508 can work individually and independently of the other functional units. The second device 508 can work individually and independently from the first device 502 and the first communication path 504 and independently from the intermediate device 506 and the second communication path 507.

For illustrative purposes, the navigation system 500 is described by operation of the first device 502, the intermediate device 506, and the second device 508. It is understood that the first device 502, the intermediate device 506, and the second device 508 can operate any of the modules and functions of the navigation system 500. For example, the first device 502 is described to operate the first location unit 520, although it is understood that the intermediate device 506 or the second device 508 can also operate the first location unit 520.

Figure 6:
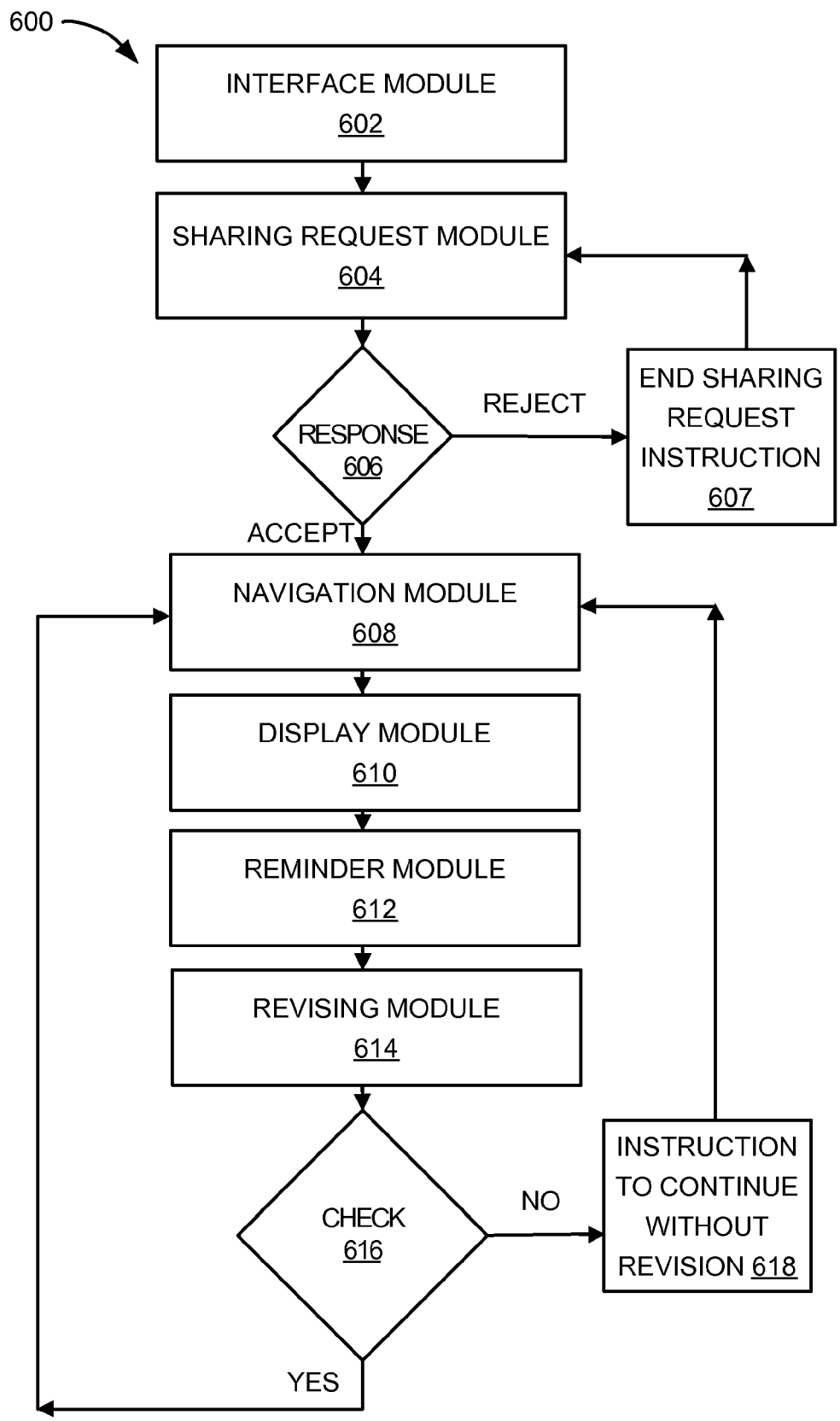
FIG. 6 is a flow chart of a navigation system in a third embodiment of the present invention.

Referring now to FIG. 6, therein is shown a flow chart of a navigation system 600 in a third embodiment of the present invention. The navigation system 600 includes: an interface module 602 for receiving and sending information; a sharing request module 604 for processing a request to share relevant information and a response 606; a navigation module 608 for performing navigation functions; a display module 610 for displaying relevant information; a reminder module for providing a reminder; and a revising module 614 for revising users' routes.

The flow chart depicts the interface module 602, which can be a module that includes input and output functions for receiving and sending information. The interface module 602 can receive an input including a user defined destination, for example, the user defined destination 218 of FIG. 2. As an example, the user defined destination 218 can be "Kifer Road and Lawrence Expressway in Sunnyvale Calif." The input can also be a request to share relevant information. Relevant information can include information such as location information, route information, estimated times of arrival and reminders.

The interface module 602 can be implemented, for example, with the first device 102 of FIG. 1. For example the interface module 602 can be implemented with the communication interface 420 of FIG. 4 receiving a user input. The control unit 408 of FIG. 4 can process the user input. The software 412 of FIG. 4 can provide the intelligence for the interface module 602.

Also for example, the interface module 602 can be implemented with the navigation system 500 of FIG. 5. For example, the interface module 602 can be implemented with the first communication interface 528 of FIG. 5, the second communication interface 550 of FIG. 5, or the third communication interface 572 of FIG. 5 receiving a user input. The first control unit 512 of FIG. 5, the second control unit 534 of FIG. 5 or the third control unit 558 of FIG. 5 can process the user input. The first software 526 of FIG. 5, the second software 542, of FIG. 5 or the third software 570 of FIG. 5 can provide the intelligence for the interface module 602.

The flow chart depicts the sharing request module 604, which can process the request to share relevant information and the response 606 to such a request. The sharing request module 604 can send the request to share relevant information from one device to another device selected by the user, for example from the first device 102 of FIG. 1 to the second device 110 of FIG. 1. The request to share relevant information can be routed through an intermediate device, for example the intermediate device 106 of FIG. 1, or can be sent directly to the other device, for example the second device 110.

The sharing request module 604 can receive the response 606 to the request. The response 606 can either be an acceptance of a rejection of the request to share relevant information. If the response 606 is an acceptance, the sharing request module 604 can receive relevant information from the accepting device, for example the second device 110. If the response 606 is a rejection then an end sharing request instruction 607 can be sent to the sharing request module 604 and no relevant information is shared with the sharing request module 604 and no joint navigation occurs.

The sharing request module 604 can, for example, be implemented, with the first device 102 of FIG. 1. The sharing request module 604 can be implemented, for example, with the communication unit 410 of FIG. 4 establishing a communication link between the first device 102 and another device, sending the request to share relevant information and receiving the response. The control unit 408 can process the request to share relevant information and the response. The software 412 can provide the intelligence for the sharing request module 604.

Also for example, the sharing request module 604 can be implemented with the navigation system 500. The sharing request module 604 can be implemented, for example, with the first communication unit 516 of FIG. 5, the second communication unit 536 of FIG. 5, or the third communication unit 554 of FIG. 5, establishing a communication link between the first device 102 and another device, sending the request to share relevant information and receiving the response. The first control unit 512, the second control unit 534, the third control unit 558, can process the request to share relevant information and the response. The first software 526, the second software 542, or the third software 570 can provide the intelligence for the sharing request module 604.

The flow chart depicts the navigation module 608. The navigation module 608 can perform navigation functions, such as providing navigation to a location, calculating an estimated time of arrival, such as the first estimated time of arrival 224 of FIG. 2, or providing a location based service. As an example, the navigation module can perform navigation functions related to relevant information such as a user defined destination, for example the user defined destination 218, a user's current location, for example the first location 216 of FIG. 2, a user's estimated time of arrival, for example the first estimated time of arrival 224, or a route between the user's location and the user defined destination, for example the first route 214 of FIG. 2.

The navigation module 608 can also perform navigation functions such as navigating to a shared location, calculating an estimated time of arrival, such as the second estimated time of arrival 226 of FIG. 2, or providing a location based service. The navigation system can perform navigation functions related to shared relevant information such as the shared location of a device, for example the second location 222 of FIG. 2, a shared route of a device, for example the second route 220 of FIG. 2, and a shared estimated time of arrival of a device, for example the second estimated time of arrival 226.

The navigation module 608 can be implemented, for example, with the first device 102 of FIG. 1. As an example, the navigation module 608 can be implemented with the location unit 406 of FIG. 4 determining the location of the first device 102. The communication unit 410 can receive the location of the second device 110. The control unit 408 can calculate the first route 214 and the second route 220. The software 412 can provide the intelligence for the navigation module 608.

Also for example, the navigation module 608 can be implemented with the navigation system 500. As an example, the navigation module 608 can be implemented with the first location unit 520 of FIG. 5 or the second location unit 564 of FIG. 5 determining the location of the first device 102. The first communication unit 516 of FIG. 5, the second communication unit 536 of FIG. 5, or the third communication unit 554 of FIG. 5 can receive the location of the second device 110. The first control unit 512, the second control unit 534, or the third control unit 558 can calculate the first route. The first software 526, the second software 542, the third software 570 can provide the intelligence for the navigation module 608.

The flow chart further depicts the display module 610. The display module 610 can receive and display relevant information such as location information, route information, estimated times of arrival and reminders. The display module can display information substantially the same as the information displayed by the display interface 202 of FIG. 2 and FIG. 3.

The display module 610 can also create audio outputs instead of or in conjunction with visual images. For example the display module 610 can create an audio output communicating the first estimated time of arrival 224 and the second estimated time of arrival 226 in addition to a visual depiction of or instead of a visual depiction of the first estimated time of arrival 224 and the second estimated time of arrival 226.

The display module 610 can be implemented, for example, with the first device 102 of FIG. 1. As an example, the display module 610 can be implemented with the display interface 202 of FIG. 4 displaying route information, relevant information or announcing an audio output. The control unit 408 can generate a visual depiction of the route information or generate the audio output. The software 412 can provide the intelligence for the display module 610.

Also for example, the display module 610 can be implemented with the navigation system 500. The display module 610 can be implemented with the first display interface 530 of FIG. 5, the second display interface 540 of FIG. 5, or the third display interface 574 of FIG. 5 displaying route information, relevant information or announcing an audio output. The first control unit 512, the second control unit 534, or the third control unit 558 can generate a visual depiction of the route information or generate the audio output. The first software 526, the second software 542, or the third software 570 can provide the intelligence for the display module 610.

The flow chart further depicts a reminder module 612, which can provide a reminder, such as the reminder 228 of FIG. 2. For example, the reminder module 612 can display a reminder announcing the second estimated time of arrival 226 and the second location 222, the selection or reception of the user defined destination 218, or the second estimated time of arrival 226 when the first device 102 reaches a preselected distance from the user defined destination 218.

As another example, the reminder module 612 can display a reminder, such as the reminder 328 of FIG. 3, of changed conditions such as, a change in the estimated time of arrival of a device due to traffic, the arrival of a device a certain distance from a destination, such as the user defined destination 218, the insertion of a waypoint, such as the waypoint 330 of FIG. 3, into a route, such as the first route 214, or the selection or reception of a new destination, such as the revised user defined destination 318. The reminder module 612 can provide an audio reminder, a visual reminder, or some combination thereof.

The reminder module 612 can be implemented, for example, with the first device 102 of FIG. 1. As an example, the reminder module 612 can be implemented with the display interface 202 providing the audio or visual reminder communicating the change in conditions. The control unit 408 can generate the audio or visual reminder. The software 412 can provide the intelligence for the reminder module 612.

Also for example, the reminder module 612 can be implemented with the navigation system 500. As an example, the reminder module 612 can be implemented with the first display interface 530, the second display interface 540, or the third display interface 574 providing the audio or visual reminder communicating the change in conditions. The first control unit 512, the second control unit 534, or the third control unit 558 can generate the audio or visual reminder. The first software 526, the second software 542, or the third software 570 cam provide the intelligence for the reminder module 612.

The flow chart further depicts the revising module 614. The revising module 614 can perform a check 616 to determine if a new user defined destination has been received, such as the revised user defined destination 318 of FIG. 3, or a waypoint, such as the waypoint 330, has been received and inserted into a route, such as the first route 214. If, for example, the revised user defined destination 318 has not been received or the waypoint 330 has not been received and inserted into the first route 214, then the revising module can send an instruction to continue without revision 618.

If a new user defined destination, such as the revised user defined destination 318, is received or if a waypoint, such as the waypoint 330, is received and inserted into a route, such as the first route 214, then the revising module 614 can instruct the navigation module to revise the first route 214 and the second route 220 based on the revised user defined destination 318 or the waypoint 330. This updated information can be shared by the first device 102 and the second device 110 or any other device that is in communication with the first device 102 or the second device 110.

The revising module 614 can be implemented, for example, with the first device 102 of FIG. 1. As an example, the revising module 614 can be implemented with the communication interface 420 receiving an input selecting the revised user defined destination 318 or the waypoint 330. The control unit 408 can revise the route, such as the first route 214 or the second route 220, based on the revised user defined destination 318 or the waypoint 330. The software 412 can provide the intelligence for the revising module 614.

Also for example, the revising module 614 can be implemented with the navigation system 500. As an example, the revising module 614 can be implemented with the first communication interface 528, the second communication interface 550, or the third communication interface 572 receiving an input selecting the revised user defined destination 318 or the waypoint 330. The first control unit 512, the second control unit 534, or the third control unit 558 can revise the route, such as the first route 214 or the second route 220, based on the revised user defined destination 318 or the waypoint 330.

The first software 526, the second software 542, or the third software 570 can provide the intelligence for the revising module 614.

The physical transformation of multiple users' location information, route information and estimated times of arrival results in movement in the physical world, such as people using the navigation system with location and route sharing or vehicles, based on the operation of the navigation system. As the movement in the physical world occurs, the movement itself creates additional information that is converted back to the multiple users' location information, route information and estimated times of arrival for the continued operation of the navigation system and to continue the movement in the physical world.

Thus, it has been discovered that the navigation system of the present invention furnishes important and heretofore unknown and unavailable solutions, capabilities, and functional aspects for providing navigation to multiple users.

Figure 7:
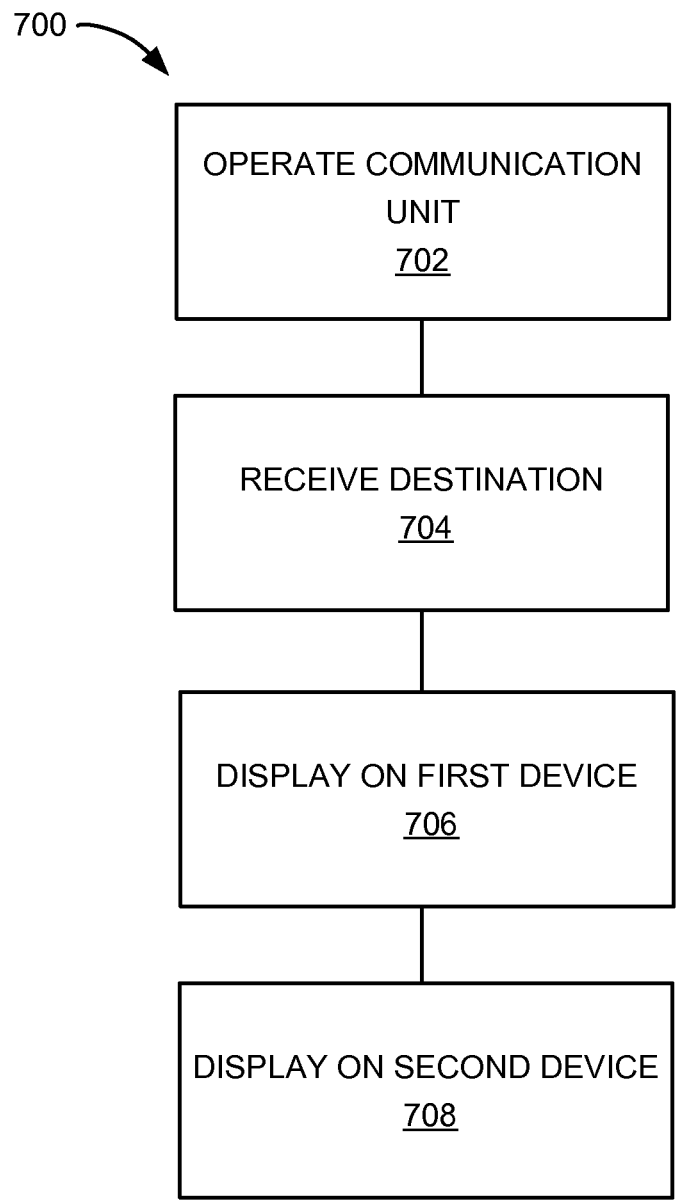
FIG. 7 is a flow chart of a method of operation of a navigation system in a further embodiment of the present invention.

Referring now to FIG. 7, therein is shown a flow chart of a method 700 of operation of the navigation system 100 in a further embodiment of the present invention. The method 700 includes: operating a communication unit for establishing a communication link between a first device and a second device in a block 702; receiving a user defined destination in a block 704; displaying a first location and a first route to the user defined destination on the first device and the second device, where the first location represents the location of the first device, in a block 706; and displaying a second location and a second route to the user defined destination on the first device and the second device, where the second location represents the location of the second device, in a block 710.

The resulting method, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    communicating a user defined destination with a communication unit for communicating the user defined destination through a communication link connected to a first device and a second device;
    generating a reminder for announcing a reception of the user defined destination for communicating the reminder between the first device and the second device;
    generating a first route from a first location to the user defined destination for navigating the first device from the first location to the user defined destination, where the first route includes a first line characteristic; and
    generating with a control unit a second route from a second location to the user defined destination for navigating the second device from the second location to the user defined destination, where the second route includes a second line characteristic displayed different from the first line characteristic.

2. The method as claimed in claim 1 further comprising:
    calculating a first estimated time of arrival for providing location based service associated with the first device and a second estimated time of arrival for providing location based service associated with the second device; and
    communicating the first estimated time of arrival and the second estimated time of arrival for providing location based service with the first device and the second device.

3. The method as claimed in claim 1 further comprising:
    receiving a waypoint between the first location and the user defined destination;
    generating a first revised route from the first route based on the waypoint; and
    communicating the first revised route for navigating with the first device and the second device.

4. The method as claimed in claim 1 further comprising:
    receiving a revised user defined destination;
    generating a first revised route and a second revised route from the first route and the second route, respectively, based on the revised user defined destination; and
    communicating the first revised route and the second revised route for navigating with the first device and the second device.

5. A method of operation of a navigation system comprising:
    communicating a user defined destination with a communication unit for communicating the user defined destination through a communication link connected to a first device and a second device;
    generating a reminder for announcing a reception of the user defined destination for announcing the reception by the second device to the first device;
    generating a first route from a first location to the user defined destination for navigating the first device from the first location to the user defined destination, where the first route includes a first line characteristic;
    generating a second route from a second location to the user defined destination for navigating the second device from the second location to the user defined destination, where the second route includes a second line characteristic displayed different from the first line characteristic; and
    generating the reminder announcing a second estimated time of arrival and the second location for further updating the first device.

6. The method as claimed in claim 5 further comprising:
    receiving a waypoint for updating the first route based on the waypoint from the second device;
    generating a first revised route from the first route based on including the waypoint in traversing from the first location to the user defined destination; and
    communicating the first revised route for displaying the first revised route on the first device, the second device, or a combination thereof.

7. The method as claimed in claim 5 wherein generating the reminder includes announcing a change in the second estimated time of arrival.

8. The method as claimed in claim 5 wherein generating the reminder includes announcing the second estimated time of arrival for providing location based service when the first device reaches a preselected distance from the user defined destination.

9. The method as claimed in claim 5 wherein generating the second route includes generating the second route including the second line characteristic for the line solidity, the line density, or a combination thereof different from the first line characteristic.

10. A navigation system comprising:
a communication unit for communicating a user defined destination for communicating the user defined destination through a communication link connected to a first device and a second device; and
a control unit, coupled to the communication unit, for:
generating a reminder for announcing a reception of the user defined destination for communicating the reminder between the first device and the second device;
generating a first route from a first location to the user defined destination for navigating the first device from the first location to the user defined destination, the first route including a first line characteristic; and
generating a second route from second location to the user defined destination for navigating the second device from the second location to the user defined destination, the second route including a second line characteristic displayed different from the first line characteristic.

11. The system as claimed in claim 10 wherein:
the control unit is for calculating a first estimated time of arrival and a second estimated time of arrival; and
wherein:
the communication unit is for communicating the first estimated time of arrival and the second estimated time of arrival for providing location based service with the first device and the second device.

12. The system as claimed in claim 10 wherein:
the control unit is for revising the first route based on a waypoint; and
the communication unit is for:
receiving the waypoint between the first location and the user defined destination, and
communicating the revised first route for navigating with the first device and the second device.

13. The system as claimed in claim 10 wherein:
the control unit is generating a first revised route and a second revised route based on revising the first route and the second route with a revised user defined destination; and
the communication unit is for:
receiving the revised user defined destination, and
communicating the revised first route and the revised second route for navigating with the first device and the second device.

14. The system as claimed in claim 10 the control unit is for:
generating the reminder for announcing the reception of the user defined destination by the second device to the first device; and
generating the reminder announcing a second estimated time of arrival and the second location for further updating the first device.

15. The system as claimed in claim 14 wherein the control unit is for generating the reminder announcing a reception of the user defined destination.

16. The system as claimed in claim 14 wherein the control unit is for generating the reminder announcing a change in the second estimated time of arrival.

17. The system as claimed in claim 14 wherein the control unit is for generating the reminder announcing the second estimated time of arrival for providing location based service when the first device reaches a preselected distance from the user defined destination.

18. The system as claimed in claim 14 wherein the control unit is for generating the second route including the second line characteristic for the line solidity, the line density, or a combination thereof different from the first line characteristic.

* * * * *